United States Patent
Gandi et al.

(10) Patent No.: US 11,379,442 B2
(45) Date of Patent: Jul. 5, 2022

(54) SELF-LEARNING DATABASE ISSUE REMEDIATION TOOL

(71) Applicant: Bank of America Corporation, Charlotte, NC (US)

(72) Inventors: Rama Krishna Venkata Gandi, Hyderabad (IN); Thangaraju Nachimuthu, Nadu (IN); Rakesh Shah, Mumbai (IN); Anant Bondalapati Sharma, Telangana (IN); Sivasankar Sivasalam, Nadu (IN)

(73) Assignee: Bank of America Corporation, Charlotte, NC (US)

( * ) Notice: Subject to any disclaimer, the term of this patent is extended or adjusted under 35 U.S.C. 154(b) by 432 days.

(21) Appl. No.: 16/736,608

(22) Filed: Jan. 7, 2020

(65) Prior Publication Data

US 2021/0209076 A1    Jul. 8, 2021

(51) Int. Cl.
| | |
|---|---|
| *G06F 16/21* | (2019.01) |
| *G06F 8/30* | (2018.01) |
| *G06N 5/04* | (2006.01) |
| *G06N 20/00* | (2019.01) |

(52) U.S. Cl.
CPC ............ *G06F 16/217* (2019.01); *G06F 8/30* (2013.01); *G06N 5/04* (2013.01); *G06N 20/00* (2019.01)

(58) Field of Classification Search
CPC ......... G06F 16/217; G06F 8/30; G06N 20/00; G06N 5/04
See application file for complete search history.

(56) References Cited

U.S. PATENT DOCUMENTS

| | | |
|---|---|---|
| 8,175,994 B2 | 5/2012 | Collard |
| 8,522,082 B1 | 8/2013 | Moore |
| 8,695,075 B2 | 4/2014 | Anderson |
| 9,183,092 B1 | 11/2015 | Marr |
| 9,384,231 B2 | 7/2016 | Benjamin |
| 9,405,605 B1 | 8/2016 | Marr |
| 9,544,327 B1 | 1/2017 | Sharma |
| 9,779,252 B2 | 10/2017 | Shauna |

(Continued)

OTHER PUBLICATIONS

Duan et al., "Proactive Identification of Performance Problems" (Year: 2006).*

(Continued)

*Primary Examiner* — Phillip H Nguyen

(57) ABSTRACT

An apparatus includes a memory and a processor. The processor collects from a database server, statistics indicating a performance of the server. The processor applies to the statistics, a machine learning algorithm configured to identify, based in part on the statistics, one or more issues affecting the performance of the database server. Applying the machine learning algorithm includes applying to the statistics, a regression algorithm trained to identify one or more candidate issues. Applying the machine learning algorithm also includes applying to the one or more candidate issues, a classification algorithm trained to classify each candidate issue as an issue of the one or more issues or a false positive. The processor additionally generates a script that, when executed, remediates the candidate issues of the one or more candidate issues classified by the classification algorithm as the issues of the one or more issues. The processor further executes the script.

20 Claims, 6 Drawing Sheets

(56) References Cited

U.S. PATENT DOCUMENTS

| | | | |
|---|---|---|---|
| 9,898,750 | B2 | 2/2018 | Compton |
| 9,934,543 | B2 | 4/2018 | Anderson |
| 10,110,505 | B2 | 10/2018 | Smith |
| 10,122,649 | B2 | 11/2018 | Smith |
| 10,262,014 | B2 | 4/2019 | Pignataro |
| 10,277,622 | B2 | 4/2019 | Digiambattista |
| 10,387,899 | B2 | 8/2019 | Fighel |
| 10,423,709 | B1 | 9/2019 | Bradley |
| 10,462,027 | B2 | 10/2019 | Chauhan |
| 2005/0055672 | A1* | 3/2005 | Ramacher ............ G06F 16/2308 717/127 |
| 2005/0055673 | A1* | 3/2005 | Dias ...................... G06F 16/217 717/127 |
| 2005/0086195 | A1* | 4/2005 | Tan ......................... G06F 16/21 |
| 2005/0138031 | A1 | 6/2005 | Wefers |
| 2006/0101520 | A1 | 5/2006 | Schumaker |
| 2008/0049776 | A1* | 2/2008 | Wiley .................. H04L 41/0896 370/419 |
| 2009/0106321 | A1* | 4/2009 | Das ................... G06F 16/24542 |
| 2009/0265200 | A1 | 10/2009 | Boswell |
| 2011/0035326 | A1 | 2/2011 | Shell |
| 2011/0093955 | A1 | 4/2011 | Chen |
| 2012/0016802 | A1 | 1/2012 | Zeng |
| 2012/0123994 | A1 | 5/2012 | Lowry |
| 2012/0216081 | A1 | 8/2012 | Duvvoori |
| 2012/0310850 | A1 | 12/2012 | Zeng |
| 2013/0282425 | A1 | 10/2013 | Zeng |
| 2014/0222521 | A1 | 8/2014 | Chait |
| 2014/0310222 | A1 | 10/2014 | Davlos |
| 2016/0098654 | A1 | 4/2016 | Bhattacharjee |
| 2016/0239374 | A1 | 8/2016 | Schnegelberger |
| 2016/0283340 | A1* | 9/2016 | Susarla ................ G06F 3/0689 |
| 2016/0344583 | A1 | 11/2016 | Contreras |
| 2017/0017537 | A1 | 1/2017 | Razin |
| 2017/0060636 | A1 | 3/2017 | Smith |
| 2018/0027088 | A1 | 1/2018 | Zou |
| 2018/0096252 | A1* | 4/2018 | Fagundes ............... G06N 5/045 |
| 2019/0095268 | A1 | 3/2019 | Mah |
| 2019/0149396 | A1 | 5/2019 | Zafer |
| 2019/0188294 | A1 | 6/2019 | Mackenthun |
| 2019/0213067 | A1 | 7/2019 | Vadivelu |
| 2019/0229915 | A1 | 7/2019 | Digiambattista |
| 2019/0230129 | A1 | 7/2019 | Digiambattista |
| 2019/0268214 | A1 | 8/2019 | Macs |
| 2019/0340617 | A1 | 11/2019 | Green |

OTHER PUBLICATIONS

Ben-Yehuda et al., "NAP: a Building Block for Remediating Performance Bottlenecks via Black Box Network Analysis" (Year: 2009).*

Nehme, "Database, Heal Thyself" (Year: 2008).*

Weikum et al., "Towards Self-Tuning Memory Management for Data Servers" (Year: 1999).*

Martin et al., "Managing database server performance tomeet QoS requirements in electronic commerce systems" (Year: 2002).*

* cited by examiner

SELF-LEARNING DATABASE ISSUE REMEDIATION TOOL

TECHNICAL FIELD

This invention relates generally to data storage and use, and specifically to a self-learning tool for identifying and remediating database issues.

BACKGROUND

Organizations often store large amounts of data in databases, which are supported by database servers. The number of database servers maintained by a particular organization may be quite large. For example, a database system may include hundreds or even thousands of database servers.

SUMMARY

Organizations often store large amounts of data in databases, which are supported by database servers. The number of database servers maintained by a particular organization may be quite large. For example, a database system may include hundreds or even thousands of database servers, serving hundreds to thousands of requests/transactions per second.

To help ensure that such database systems are performing optimally, system administrators are typically tasked with monitoring the performance of the database servers and remediating any performance issues identified. Such administrators may identify performance issues themselves—through proactive monitoring and/or automated alert signals—or may be notified of such issues by users of the systems, who may submit help tickets to the administrators when encountering sub-optimal performance. Many of these issues—such as an insufficient amount of allocated space—often occur repeatedly. Accordingly, after a performance issue is encountered and remediated for the first time, it is likely a straightforward process to identify methods to appropriately remediate subsequent occurrences of similar issues. However, given the size of typical database systems, it may not be possible for system administrators to identify and remediate performance issues (including known, reoccurring issues) in real-time. For example, during the time it may take for a system administrator to review a help ticket submitted by a user, identify the issue affecting the user, and then remediate the issue, the user may have experienced a significant loss of service and/or data. Accordingly, traditional database server systems typically experience considerable downtime as a result of performance issues, potentially leading to user dissatisfaction.

This disclosure contemplates a self-learning database issue remediate tool that addresses one or more of the above technical problems. The tool monitors the performance of one or more database servers and uses a machine learning algorithm to identify potential issues, by identifying patterns in current performance statistics based on training with historical performance statistics, associated with previously encountered issues. In response to identifying a performance issue, the tool generates a script to remediate the issue, based on previous commands used to remediate previous issues. In this manner, certain embodiments of the tool may automatically identify and remediate database performance issues before the database servers experience any downtime. Certain embodiments of the tool are described below.

According to one embodiment, an apparatus includes a memory and a hardware processor. The hardware processor collects from a database server, statistics indicating a performance of the database server. The processor applies to the statistics, a machine learning algorithm configured to identify, based in part on the statistics, one or more issues affecting the performance of the database server. Applying the machine learning algorithm includes applying to the statistics, a regression algorithm trained to identify one or more candidate issues. Each candidate issue of the one or more candidate issues is identified by the regression algorithm as affecting the performance of the database server. Applying the machine learning algorithm also includes applying to the one or more candidate issues, a classification algorithm trained to classify each candidate issue of the one or more candidate issues as an issue of the one or more issues or a false positive. The processor additionally generates a script that includes program code. When executed, the script remediates the candidate issues of the one or more candidate issues classified by the classification algorithm as the issues of the one or more issues. The processor further executes the script.

According to another embodiment, a method includes collecting from a database server, statistics indicating a performance of the database server. The method also includes applying to the statistics, a machine learning algorithm configured to identify, based in part on the statistics, one or more issues affecting the performance of the database server. Applying the machine learning algorithm includes applying to the statistics, a regression algorithm trained to identify one or more candidate issues. Each candidate issue of the one or more candidate issues is identified by the regression algorithm as affecting the performance of the database server. Applying the machine learning algorithm also includes applying to the one or more candidate issues, a classification algorithm trained to classify each candidate issue of the one or more candidate issues as an issue of the one or more issues or a false positive. The method additionally includes generating a script that includes program code. When executed, the script remediates the candidate issues of the one or more candidate issues classified by the classification algorithm as the issues of the one or more issues. The method further includes executing the script.

According to a further embodiment, a system includes a database server, a storage element, and a processing element. The processing element is operable to collect from the database server, statistics indicating a performance of the database server. The statistics includes at least one of processor usage by the database server, memory usage by the database server, and storage usage by the database server. The processing element is also operable to apply to the statistics, a machine learning algorithm configured to identify, based in part on the statistics, one or more issues affecting the performance of the database server. Applying the machine learning algorithm includes applying to the statistics, a regression algorithm trained to identify one or more candidate issues. Each candidate issue of the one or more candidate issues is identified by the regression algorithm as affecting the performance of the database server. Applying the machine learning algorithm also includes applying to the one or more candidate issues, a classification algorithm trained to classify each candidate issue of the one or more candidate issues as an issue of the one or more issues or a false positive. The processing element is additionally operable to generate a script that includes program code. When executed, the program code remediates the candidate issues of the one or more candidate issues classified by the classification algorithm as the issues of the one or more issues. The processing element is further operable to execute the script.

Certain embodiments provide one or more technical advantages. For example, an embodiment increases the efficiency of the database issue remediation process, by automatically identifying and remediating database issues. As another example, an embodiment limits the amount of downtime experienced by database servers in a database system, by identifying issues at an early enough stage such that remediation may be accomplished without downtime. The system described in the present disclosure may particularly be integrated into a practical application of an issue remediation tool for use by an organization to improve the performance of the database servers belonging to the organization, as compared to a traditional database server system operating without the tool. In particular, the tool may be used to continuously monitor any number of database servers belonging to the organization, to automatically identify and remediate issues affecting the database servers, before these issues lead to database server downtime. The tool may also be configured to automatically remediate common, recurring issues, thereby enabling system administrators to focus their time and energy on more difficult issues.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 5 of the drawings, like numerals being used for like and corresponding parts of the various drawings.

I. System Overview

Figure 1:
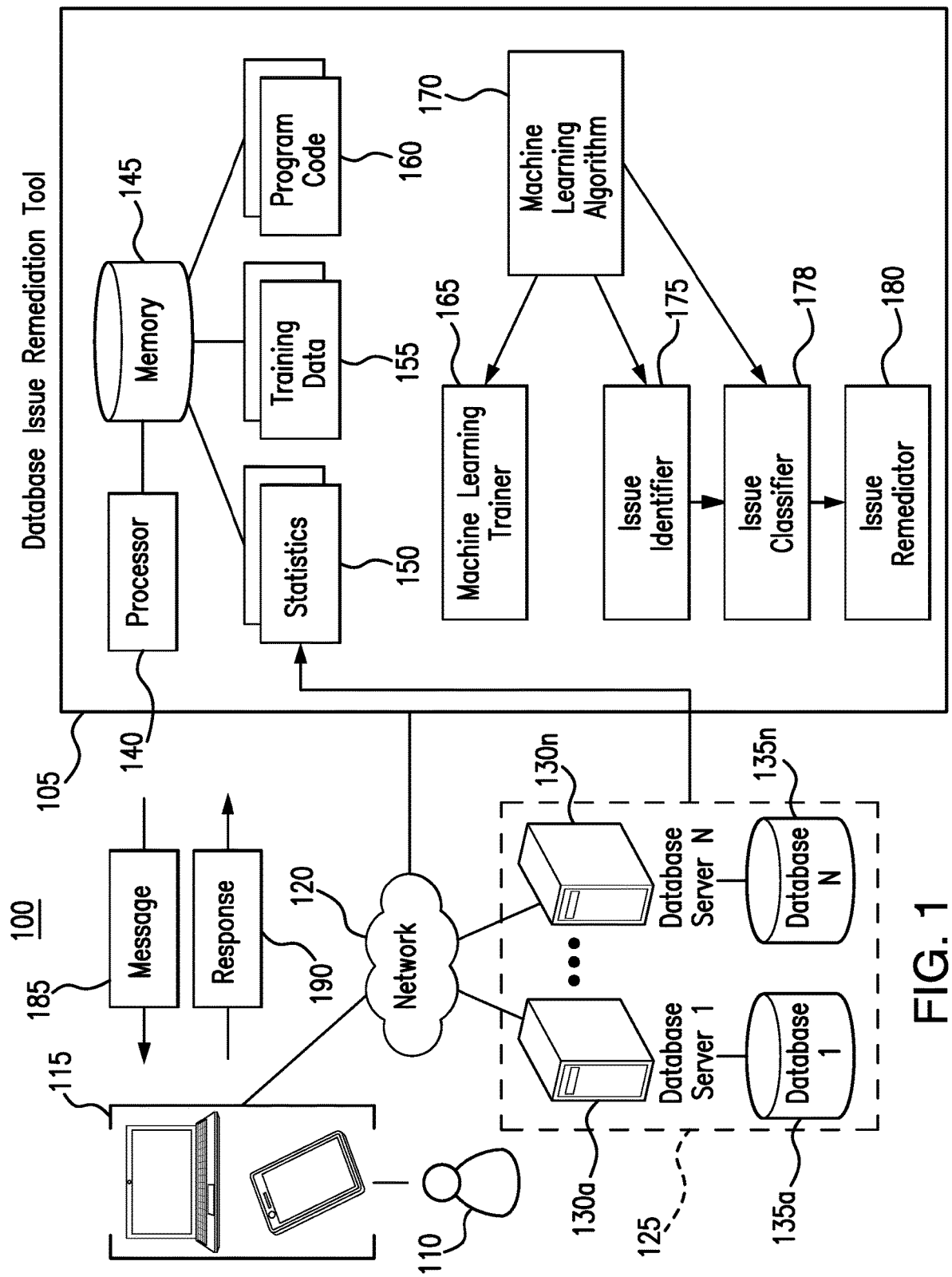
FIG. 1 illustrates an example database issue remediation system.

FIG. 1 illustrates an example system 100 that includes database issue remediation tool 105, user(s) 110, device(s) 115, network 120, and database system 125. Generally, database issue remediation tool 105 monitors database system 125, by collecting statistics 150 from database system 125, applies machine learning algorithm 170 to statistics 150, to identify performance issues likely affecting database system 125, and generates and executes program code scripts to remediate the identified performance issues. The manner by which database issue remediation tool 105 performs such tasks will be described in further detail below, in the discussion of FIGS. 2 through 4.

Devices 115 may be used by users 110 to receive messages 185 and to send responses 190. Messages 185 may include requests for input from users 110. For example, in certain embodiments, database issue remediation tool 105 may identify multiple methods (e.g., multiple program code scripts) by which an identified performance issue may be remediated. In such embodiments, database issue remediation tool 105 may send message 185 to user 110, requesting user 110 to select from among the multiple identified remediation options. User 110 may then indicate his/her selection in response 190. As another example, in certain embodiments, message 185 may include an indication of a performance issue identified by database issue remediation tool 105. Message 185 may also include a request for user 110 to approve remediation of the identified issue. Response 190 may then indicate either that database issue remediation tool 105 is to remediate the identified issue or that database issue remediation tool 105 is not to remediate the identified issue. For example, in certain embodiments, along with identifying a potential performance issue, database issue remediation tool 105 may also determine a probability that the identified issue corresponds to a real issue. In such embodiments, database issue remediation tool 105 may send message 185 requesting that user 110 approve remediation of the identified issue, when this probability is above a first threshold, but below a second threshold. For example, database issue remediation tool 105 may send message 185 when it determines that the probability that an identified issue is a real issue is between 80% and 90%. This disclosure contemplates that the first threshold and the second threshold may be customizable by user 110. In this manner, user 110 may specify the degree of control he/she would like to have over the database issue remediation process.

Devices 115 include any appropriate device for communicating with components of system 100 over network 120. For example, devices 115 may be a telephone, a mobile phone, a computer, a laptop, a wireless or cellular telephone, a tablet, a server, and IoT device, and/or an automated assistant, among others. This disclosure contemplates devices 115 being any appropriate device for sending and receiving communications over network 120. Device 115 may also include a user interface, such as a display, a microphone, keypad, or other appropriate terminal equipment usable by user 110. In some embodiments, an application executed by a processor of device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database system 125 includes database servers 130a through 130n and databases 135a through 135n. Databases 135a through 135n act as data repositories, storing data. Databases 135a through 135n may correspond to relational databases, non-relational databases, or any other type of databases. Database servers 130a through 130n control the operation of databases 135 and provide database services to users 110. For example, users 110 may connect to database servers 130a through 130n to access data stored in databases 135a through 135n, store data in databases 135a through 135n, and/or perform analysis on data stored in databases 135a through 135n. Database servers 130a through 130n may correspond to hardware database servers, software database servers, or a combination of hardware and software database servers.

As seen in FIG. 1, database issue remediation tool 105 includes a processor 140 and a memory 145. This disclosure contemplates processor 140 and memory 145 being configured to perform any of the functions of database issue remediation tool 105 described herein. Generally, database issue remediation tool 105 implements machine learning trainer 165, machine learning issue identifier 175, machine learning issue classifier 178, and issue remediator 180. Machine learning trainer 165 uses training data 155 to train machine learning algorithm 170 to identify potential issues affecting database system 125, based on database performance statistics 150, as described in further detail below, in the discussion of FIG. 2. Machine learning issue identifier 175 applies the regression component of trained machine learning algorithm 170 to performance statistics 150, to identify potential issues affecting database system 125, as described in further detail below, in the discussion of FIG. 3A. Machine learning issue classifier 178 applies the classification component of trained machine learning algorithm 170 to the potential issues identified by machine learning issue identifier 175, to classify the issues as real issue or false positives, as described in further detail below, in the discussion of FIG. 3B. Issue remediator 180 generates and executes program code scripts to remediate the real issues identified by machine learning issue classifier 178, as described in further detail below, in the discussion of FIG. 4.

Processor 140 is any electronic circuitry, including, but not limited to microprocessors, application specific integrated circuits (ASIC), application specific instruction set processor (ASIP), and/or state machines, that communicatively couples to memory 145 and controls the operation of database issue remediation tool 105. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of database issue remediation tool 105 by processing information received from network 120, device(s) 115, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Memory 145 may also store statistics 150, training data 155, and program code 160. Statistics 150 include performance statistics gathered from database system 125. This disclosure contemplates that statistics 150 may include any information that may be indicative of the performance of database system 125. For example, statistics 150 may include the processor usage of each of database servers 130a through 130n over time, the memory usage of each of database servers 130a through 130n over time, the storage usage of database servers 130a through 130n over time, the available storage in databases 135a through 135n over time, and/or any other suitable performance metric. This disclosure contemplates that database issue remediation tool 105 may gather statistics 150 by accessing each of database servers 130a through 130n. Database issue remediation tool 105 may access database servers 130a through 130n at any suitable times. For example, in certain embodiments, database issue remediation tool 105 may access each of database servers 130a through 130n at set time intervals. In some embodiments, database issue remediation tool 105 may access database servers 130a through 130n at different time intervals. For example, database issue remediation tool 105 may access database server 130a more frequently than database server 130b. This may be desirable where certain database servers 130 are used by users 110 more frequently than others or are known to be more prone to issues than others.

Training data 155 may include historical performance statistics and historical issues. The historical issues may include issues previously identified by system administrators. Based on the historical statistics at and/or around the time the historical issues were identified, training data 155 may be used to train machine learning algorithm 170 to establish associations between the historical statistics and the historical issues. In certain embodiments, training data 155 may also include program code blocks used by system administrators to remediate the historical issues. Based on the program code blocks used to remediate the historical issues, training data 155 may be used to train machine learning algorithm 170 to learn from the application of the program code blocks to remediate the historical issues, such that it may create and suggest future program codes to remediate future issues.

Program code blocks 160 include pieces of program code that may be used to generate issue remediation scripts to remediate issues identified by machine learning algorithm 170. For example, database issue remediation tool 105 may select a subset of program code blocks from the full set of program code blocks 160, to generate a remediation script. Program code blocks 160 may include adjustable parameters, whose values may be set by database issue remediation tool 105 to address a given identified issue.

Modifications, additions, or omissions may be made to the systems described herein without departing from the scope of the invention. For example, system 100 may include any number of users 110, devices 115, networks 120, and database systems 125. The components may be integrated or separated. Moreover, the operations may be performed by more, fewer, or other components. Additionally, the operations may be performed using any suitable logic comprising software, hardware, and/or other logic.

II. Self-Learning Issue Identification

Figure 2:
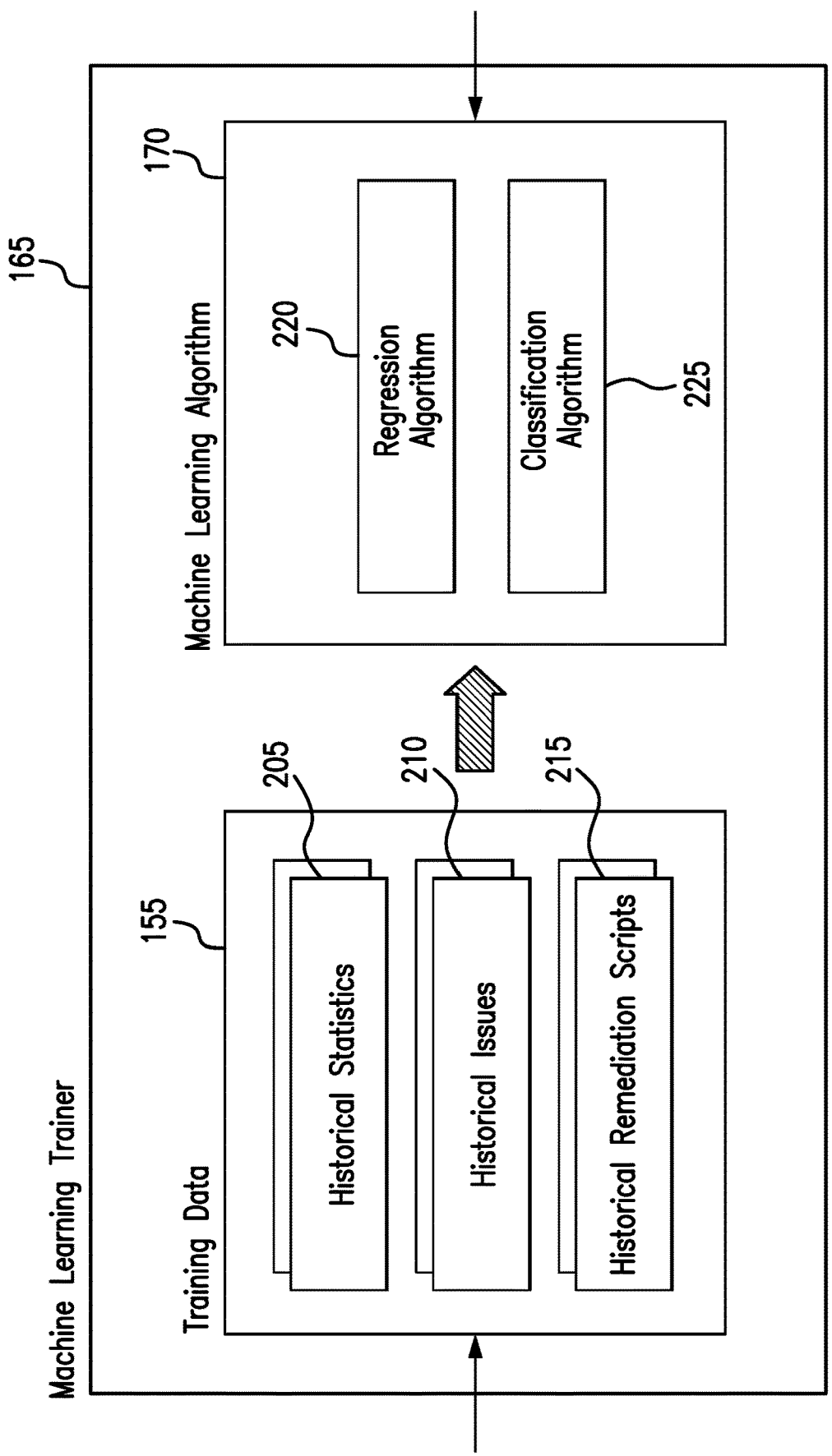
FIG. 2 illustrates the machine learning trainer component of the database issue remediation tool of the system of FIG. 1.

As described above, database issue remediation tool 105 is configured to learn from previously identified issues affecting database system 125, to identify current issues that may be affecting the database system. FIGS. 2 and 3 illustrate an example manner by which database issue remediation tool 105 performs such self-learning.

FIG. 2 illustrates an example machine learning trainer component 165 of database issue remediation tool 105. Machine learning trainer 165 is configured to use training data 155 to train machine learning algorithm 170 to detect potential performance issues affecting database system 125, based on performance statistics 150 gathered from database system 125.

As illustrated in FIG. 2, training data 155 may include historical statistics 205, historical issues 210, and historical issue remediation scripts 215. Historical statistics 205 may include performance statistics collected from database system 125 over time. This disclosure contemplates that historical statistics 205 may include any information that may have been indicative of the performance of database system 125 at a given point in time in the history of database system 125. For example, historical statistics 205 may include the processor usage of each of database servers 130a through 130n over time, the memory usage of each of database servers 130a through 130n over time, the storage usage of database servers 130a through 130n over time, the available storage in databases 135a through 135n over time, and/or any other suitable performance metric.

Historical issues 210 may include issues previously identified as affecting the performance of database system 125. In certain embodiments, historical issues 210 may have been previously identified by system administrators. For example, historical issues 210 may be associated with incident numbers submitted to system administrators as help tickets. Such historical issues 210 may include database connection problems, database capacity problems, or situations in which one or more databases 135 stopped functioning. In some embodiments, historical issues 210 may include issues previously identified by system administrators as well as issues previously identified by database issue remediation tool 105. In certain embodiments, historical issues 210 may include real issues that actually affected the performance of database system 125, along with false positives that did not actually affect the performance of database system 125. In such embodiments, each historical issue of historical issues 120 may include an indication that the issue was a real issue or a false positive.

Based on the historical statistics 205 at and/or around the time historical issues 210 were identified, training data 155 may be used to train machine learning algorithm 170 to establish associations between the historical statistics 205 and the historical issues 210. For example, machine learning trainer 165 may use training data 155 to determine coefficients or other metrics used by machine learning algorithm 170 to generate predictions of the issues (if any) currently affecting the performance of database system 125. This disclosure contemplates that machine learning algorithm 170 may be any suitable machine learning algorithm for identifying potential performance issues from performance statistics. For example, in certain embodiments, machine learning algorithm 170 may include a regression algorithm 220 and a classification algorithm 225. Regression algorithm 220 may be trained to identify potential performance issues currently affecting database system 125. Classification algorithm 225 may be trained to classify each potential performance issue identified by regression algorithm 220 as a real issue or a false positive.

In certain embodiments, training data 155 may also include historical remediation scripts 215 used by system administrators to remediate the historical issues. Based on the program code blocks included in historical remediation scripts 215, machine learning trainer 165 may use training data 155 to train machine learning algorithm 170 to learn from the historical application of the program code blocks used to remediate the historical issues, such that machine learning algorithm 170 may create and suggest future program code scripts to remediate future identified issues.

Figure 3A:
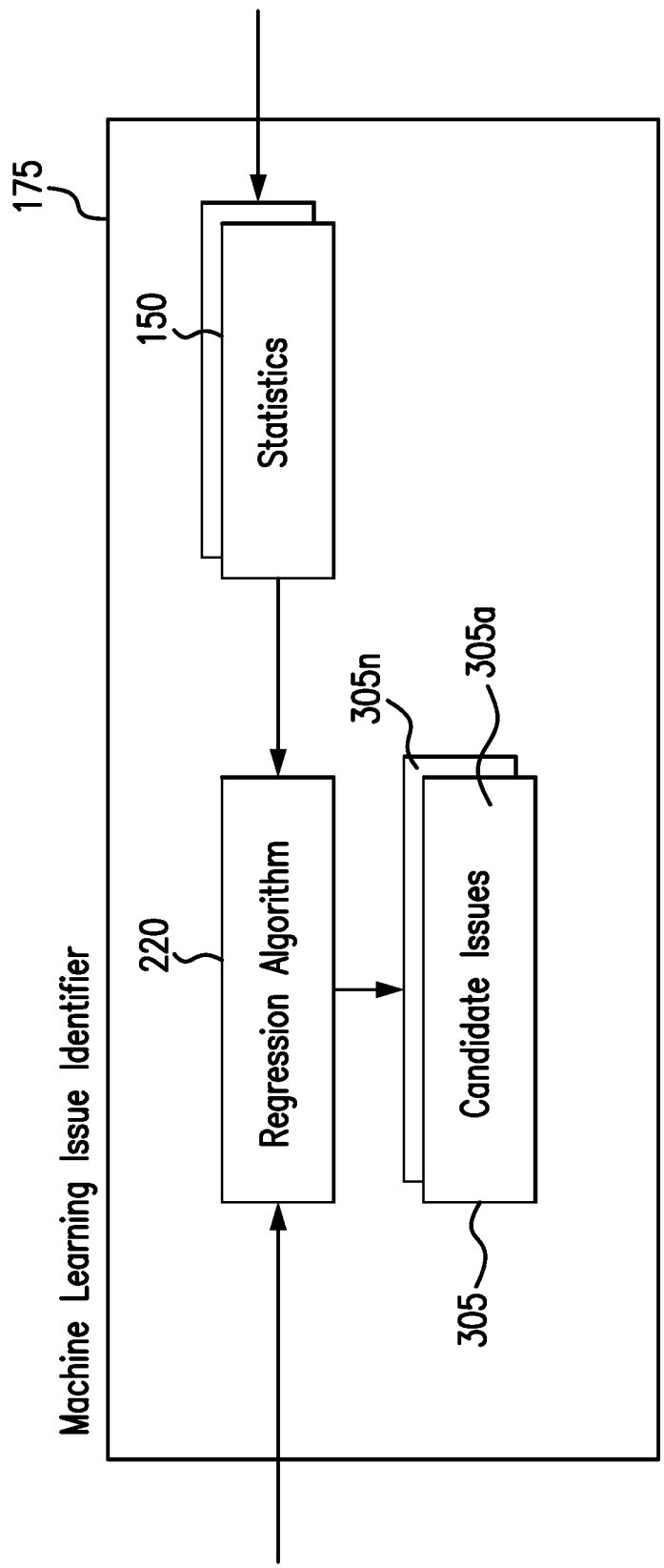
FIG. 3A illustrates the machine learning issue identifier component of the database issue remediation tool of the system of FIG. 1.
Figure 3B:
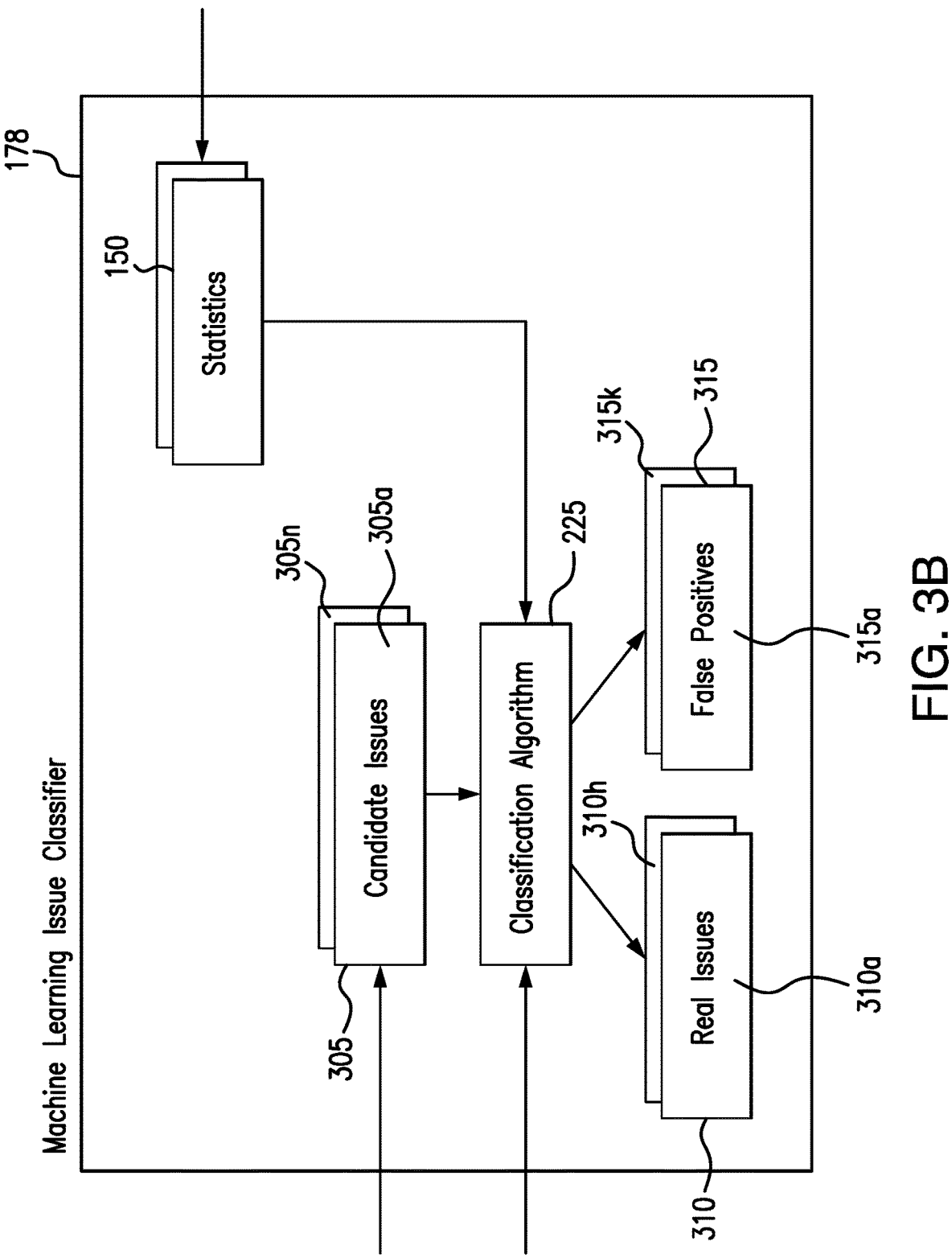
FIG. 3B illustrates the machine learning issue classifier component of the database issue remediation tool of the system of FIG. 1.

FIGS. 3A and 3B illustrate an example machine learning issue identifier component 175 of database issue remediation tool 105 and an example machine learning issue classifier component 178 of database issue remediation tool 105, respectively. Machine learning issue identifier component 175 is configured to apply the regression algorithm 220 of machine learning algorithm 170 to statistics 150, gathered from database system 125, to identify candidate issues affecting the performance of database system 125. Machine learning issue classifier 178 is configured to apply the classification algorithm 225 of machine learning algorithm 170 to the candidate issues identified by machine learning issue identifier 175, to classify each issue as a real issue or a false positive.

This disclosure contemplates that regression algorithm 220 may identify any number of candidate issues 305a through 305n. Additionally, regression algorithm 220 may identify a candidate issue 305a in any suitable manner. As an example, regression algorithm 220 may identify candidate issue 305a by determining that a certain database performance metric is below an acceptable standard. For example, regression algorithm 220 may identify candidate issue 305a in part by detecting that the storage space allocated to database server 130a is no longer sufficient (e.g., the space is 90% used). Different acceptable standards may be associated with different database servers 130. For example, regression algorithm 220 may identify candidate issue 305a in part by detecting that the storage space allocated to database server 130a is over 95% utilized, while regression algorithm 220 may identify candidate issue 305n in part by detecting that the storage space allocated to database server 130n is over 75% utilized. These different standards may arise from the different uses of database servers 130. For example, historical performance statistics 205 may indicate that the storage space allocated to database server 130a is used very slowly. Accordingly, by identifying candidate issue 305a when the storage space allocated to database server 130a is over 95% utilized, database issue remediation tool 105 may avoid allocating unnecessary space to database server 130a, while nevertheless helping to ensure that enough time is available to remediate candidate issue 305a, before all (or essentially all) of the storage space is used up. On the other hand, historical performance statistics 205 may indicate that database server 130n frequently experiences situations in which large amounts of its available storage is used over a short period of time. Accordingly, identifying candidate issue 305n when the storage space allocated to database server 130n is over 75% utilized may allow database issue remediation tool 105 to allocate additional space to database server 135n, before all (or essentially all) of the storage space is used up. This disclosure contemplates that regression algorithm 220 may be any suitable machine learning regression algorithm. For example, regression algorithm 220 may be a linear regression algorithm, a logistic regression algorithm, or any other suitable regression algorithm.

Machine learning issue identifier 175 may be a software module stored in memory 145 and executed by processor 140. An example of the operation of machine learning issue identifier 175 is as follows: (1) apply regression algorithm to statistics 150; and (2) identify candidate issues 305.

After regression algorithm 220 has identified one or more candidate issues 305, machine learning issue classifier 178 may then apply classification algorithm 225 to these candidate issues 305. This disclosure contemplates that machine learning issue classifier 178 is configured to operate in parallel with machine learning issue identifier 175. While machine learning issue identifier 175 is configured to identify candidate issues 305 before such candidate issues occur in database servers 130, machine learning issue classifier 178 is configured to classify each candidate issue 305 as a real issue 310 or a false positive 315 after the time at which machine learning issue identifier 175 has predicted such candidate issue 305 to occur. For example, if machine learning issue identifier 175 predicts that a first candidate issue 305 will occur at a first time in database servers 130, then once that first time is reached, machine learning issue classifier is applied to statistics 150 to classify candidate as a real issue 310 or a false positive 315.

As described above, in the discussion of FIG. 2, classification algorithm 225 may be trained to classify each of candidate issues 305a through 305n as either a real issue 310 or a false positive 315. Real issues 310 correspond to issues that should be addressed by database issue remediation tool 105, while false positives 315 correspond to issues that do not need to be addressed by database issue remediation tool 105. Regression algorithm 220 may identify false positives 315 as candidate issues 305, based on the historical issues 210, previously identified. For example, performance statistics 150 may be such that regression algorithm 220 identifies a candidate issue 305a as having a high probability of negatively affecting the performance of database system 125, consistent with a determination that a system administrator would make, were the system administrator independently monitoring statistics 150. However, candidate issue 305a may not actually correspond to an issue that needs to be addressed. Accordingly, classification algorithm 225 is configured to identify such false positives, based on patterns or other indications in statistics 150. This disclosure contemplates that classification algorithm 225 may be any suitable machine learning classification algorithm. For example, classification algorithm 225 may be a decision tree algorithm, a neural network algorithm, a random forest algorithm, or any other suitable classification algorithm.

In certain embodiments, machine learning issue classifier 178 may identify a real issue 310, based on a determined probability that the issue is an actual issue affecting the performance of database system 125. As an example, real issues 310 may include those issues identified by machine learning issue classifier 178 as associated with a probability of corresponding to an actual issue that is greater than a set threshold. For example, real issues 310 may include those issues that machine learning issue classifier 178 has identified as 95% likely to correspond with an actual issue impacting database system 125.

Machine learning issue classifier 178 may be a software module stored in memory 145 and executed by processor 140. An example of the operation of machine learning issue classifier 178 is as follows: (1) receive one or more candidate issues 305 from machine learning issue identifier 175; (2) for a given candidate issue 305, wait until the time identified by machine learning issue identifier 175 as when candidate issue 305 is expected to occur passes; (3) apply regression algorithm to statistics 150; and (4) identify the candidate issue 305 as a real issue 310 or a false positive 315.

III. Automatic Issue Remediation

In certain embodiments, after identifying real issues 310, database issue remediation tool 105 generates one or more remediation scripts that, when executed, remediate real issues 310. Database issue remediation tool 105 then executes the remediation scripts, to remediate real issues 310.

Figure 4:
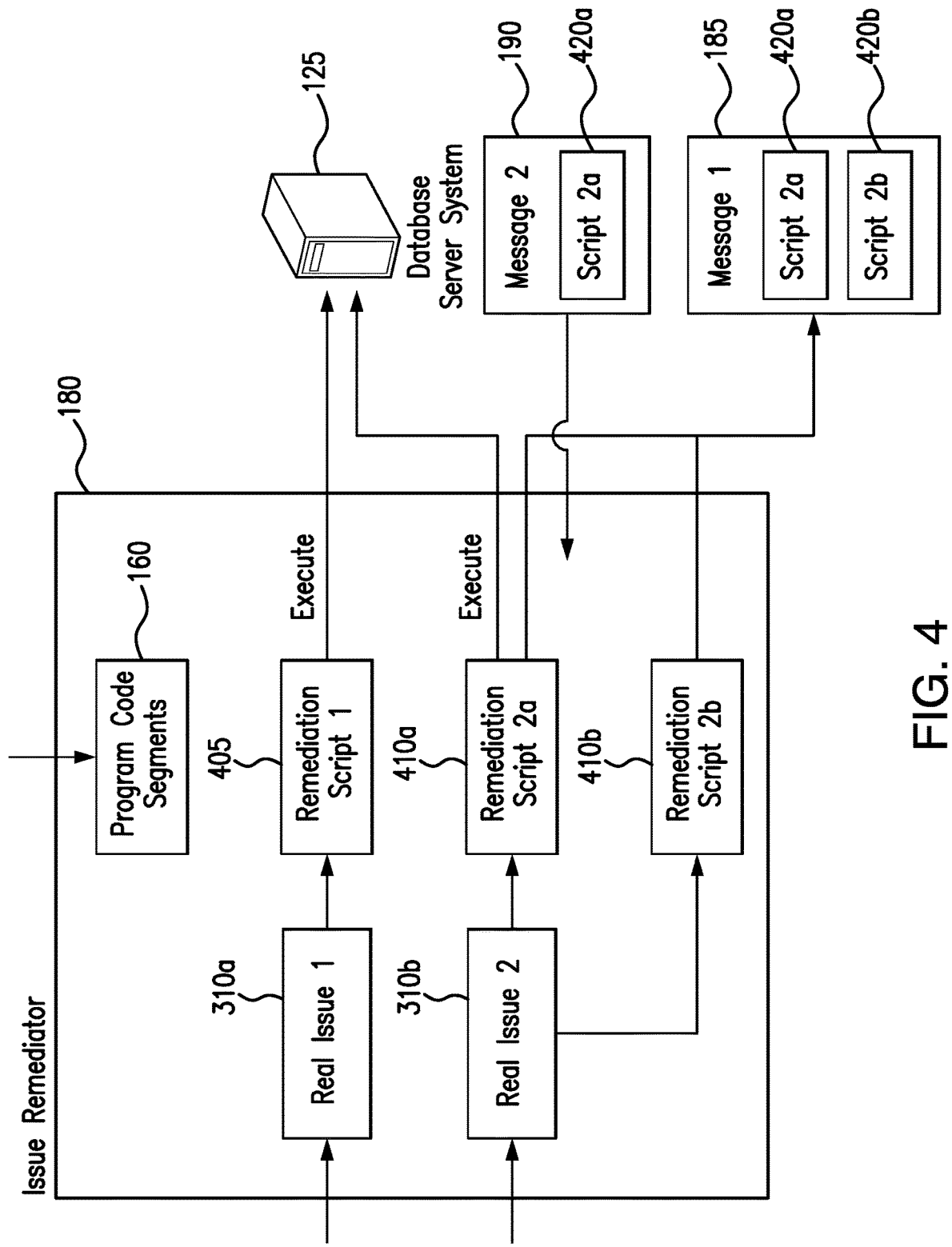
FIG. 4 illustrates the issue remediation component of the database issue remediation tool of the system of FIG. 1.

FIG. 4 illustrates an example issue remediator component 180 of database issue remediation tool 105. The example illustrated in FIG. 4 depicts issue remediator 180 operating on two real issues identified by machine learning issue identifier 175—first real issue 310a and second real issue 310b. Issue remediator 180 uses program code segments 160 to generate remediation scripts which, when executed, are configured to remediate first real issue 310a and second real issue 310b. For example, issue remediator 180 may use program code segments 160 to generate first remediation script 405, second remediation script 410a, and third remediation script 410b. As illustrated in FIG. 4, first remediation script 405 is configured, when executed, to remediate first real issue 310a, while both second remediation script 410a and third remediation script 410b are configured to remediate second real issue 310b. Here, both second remediation script 410a and third remediation script 410b represent methods, identified by issue remediator 180, which may be used to remediate second real issue 310b.

This disclosure contemplates that issue remediator 180 may generate remediation scripts 405 and 410 in any suitable manner. For example, in certain embodiments, issue remediator 180 uses machine learning algorithm 170 to generate remediation scripts 405 and 410. In such embodiments, machine learning algorithm 170 may be trained to learn from the prior use of program code segments 160 to remediate historical issues 210, allowing machine learning algorithm 170 to create remediation scripts 405 and 410 to remediate real issues 310. In certain embodiments, program code segments 160 may include one or more adjustable parameters, such that generating remediation scripts 405 and 410 may include not only selecting one or more program code segments from the set of program code segments 160, but also selecting values for the adjustable parameters. Here, machine learning algorithm 170 may be configured to select values for the adjustable parameters.

In certain embodiments, in response to generating a remediation script 405, issue remediator 180 is configured to execute the script. Executing the script causes database issue remediation tool 105 to perform each of the instructions included in the script, thereby remediating real issue 310a identified by machine learning issue identifier 175. In certain embodiments in which issue remediator 180 identifies more than one method to remediate real issue 310b (e.g., issue remediator 180 identifiers multiple remediation scripts 410a and 410b, any of which may be used to remediate real issue 310b), issue remediator 180 is configured to transmit a message 185 to user 110, identifying the available remediation options, and requesting that user 110 select an option from the available remediation options. For example, message 185 may include a first identification 420a of a first remediation option, corresponding to remediation script 410a, and a second identification 420b of a second remediation option, corresponding to remediation script 410b. Message 185 may also include any other suitable information. For example, message 185 may include an identification of real issue 310b. In response to receiving message 185, user 110 may transmit a response 190 to database issue remediation tool 105. Response 190 may include an identification of one of the remediation options presented in message 185. For example, response 190 may include identification 420a, indicating that user 110 has selected the remediation option corresponding to remediation script 410a. In response to receiving user 110's selection, issue remediator 180 may execute remediation script 410a, to remediate real issue 310b.

This disclosure contemplates that the behavior of issue remediator 180 may be configurable, based on the level of control a user 110 (e.g., a system administrator) wishes to have with regard to the issue remediation process. For example, in certain embodiments, prior to executing any remediation scripts 405, issue remediator 180 may be configured to send a message 185 to user 110, requesting that user 110 approve the identified remediation method. As another example, in certain embodiments, issue remediator 180 may be further configured to classify each real issue 310 as either a common, recurring issue, or an uncommon issue. For example, a common, recurring issue may be one that has occurred more than a set number of times, while an uncommon issue may be one that has occurred fewer than the set number of times. Here, the set number of times may be customizable by user 110. In response to classifying a real issue 310 as a common issue, issue remediator 180 may be configured to automatically execute remediation script 405, to remediate the issue. On the other hand, in response to classifying real issue 310 as an uncommon issue, issue remediator 180 may be configured to transmit message 185 to user 110, requesting that user 110 approve the identified remediation method (e.g., remediation script 405). As another example, in certain embodiments, issue remediator 180 may be configured to automatically remediate issues associated with some, but not all of database servers 130. For example, issue remediator 180 may be configured to automatically execute remediation scripts 405, to remediate issues occurring with database servers 130a through 130c. On the other hand, issue remediator 180 may be configured to transmit messages 185 to user 110, requesting that user 110 approve any identified remediation method (e.g., remediation script 405), prior to performing the remediation method (e.g., executing remediation script 405). As a further example, in certain embodiments in which machine learning issue identifier 175 identifies real issues 310 as those issues associated with probabilities of corresponding to an actual issue affecting the performance of database system 125 that are greater than a first set threshold, issue remediator 180 may determine whether or not to transmit a message 185 to user 110, seeking approval of an identified remediation method, based on the value of the probability associated with the real issue 310. For example, issue remediator 180 may automatically execute remediation scripts 405 for those real issues 310 associated with probabilities greater than a second set threshold, where the second set threshold is greater than the first set threshold. On the other hand, issue remediator 180 may transmit messages 185 to users 110, seeking approval of an identified remediation method (e.g., remediation script 405), for those real issues 310 associated with probabilities greater than the first set threshold, but less than the second set threshold. For example, issue remediator 180 may automatically remediate those real issues 310 associated with probabilities between 90% and 100%, and transmit messages 185 to users 110, seeking approval of an identified remediation method for those real issues 310 associated with probabilities between 80% and 90%.

IV. Method for Issue Identification and Remediation

Figure 5:
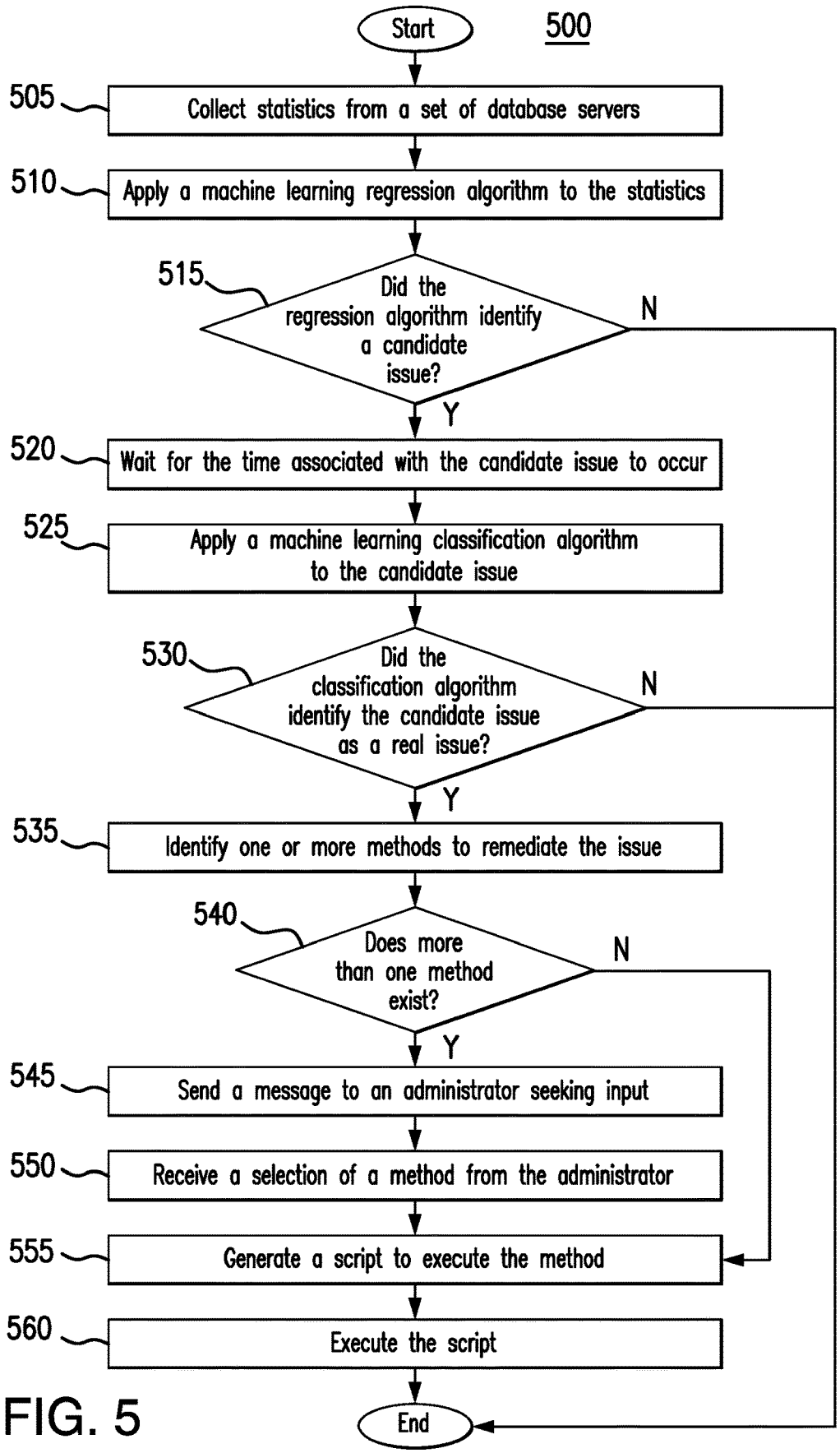
FIG. 5 presents a flowchart illustrating the process by which the database issue remediation tool of the system of FIG. 1 identifies and remediates issues affecting a database system.

FIG. 5 presents a flowchart illustrating an example method by which database issue remediation tool 105 identifies and remediates issues 310 affecting database system 125. In step 505, database issue remediation tool 105 collects statistics 150 from database system 125. In step 510, database issue remediation tool 105 applies regression algorithm 220 to statistics 150. In step 515, database issue remediation tool 105 determines whether regression algorithm 220 identified a candidate issue 305.

If, in step 515, database issue remediation tool 105 determines that regression algorithm 220 identified a candidate issue 305, in step 520, database issue remediation tool 105 waits for the time associated with the candidate issue 305 to occur. For example, regression algorithm 220 may have identified candidate issue 305 as an issue that will likely affect database system 125 at a first time. Accordingly, in step 520, database issue remediation tool 105 waits for that first time to occur. After waiting for that first time to occur, database issue remediation tool 105 next applies classification algorithm 225 to the candidate issue 305 identified by regression algorithm 220, in step 525. Classification algorithm 225 is configured to classify the candidate issue 305 as either a real issue 310 or a false positive 315. In step 530, database issue remediation tool 105 determines whether classification algorithm 225 classified candidate issues 305 as a real issue 310.

If, in step 530, database issue remediation tool 105 determines that classification algorithm 225 classified candidate issue 305 as a real issue 310, in step 535, database issue remediation tool 105 identifies one or more methods to remediate real issue 310. For example, database issue remediation tool 105 identifies one or more program code scripts that may be used to remediate real issue 310. In step 540, database issue remediation tool 105 determines whether more than one method exists.

If, in step 540, database issue remediation tool 105 determines that more than one method exists, in step 545, database issue remediation tool 105 sends a message 185 to user 110, seeking input from user 110. For example, message 185 may request that user 110 choose a method from among the methods identified by database issue remediation tool 105. In step 550, database issue remediation tool 105 receives a selection from user 110 of a method from among the methods identified by database issue remediation tool 105. In step 555, database issue remediation tool 105 generates a program code script from program code blocks 160, to execute the method selected by user 110. Finally, in step 560, database issue remediation tool 105 executes the program code script to remediate real issue 310.

Modifications, additions, or omissions may be made to method 500 depicted in FIG. 5. Method 500 may include more, fewer, or other steps. For example, steps may be performed in parallel or in any suitable order. While discussed as database issue remediation tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
   a memory; and
   a hardware processor configured to:
   collect from a database server, statistics indicating a performance of the database server;
   apply to the statistics, a machine learning algorithm configured to identify, based in part on the statistics, one or more issues affecting the performance of the database server, wherein applying the machine learning algorithm comprises:
   applying to the statistics, a regression algorithm trained to identify one or more candidate issues, each candidate issue of the one or more candidate issues identified by the regression algorithm as affecting the performance of the database server; and
   applying to the one or more candidate issues, a classification algorithm trained to classify each candidate issue of the one or more candidate issues as an issue of the one or more issues or a false positive;
   generate a script comprising program code that, when executed, remediates the candidate issues of the one or more candidate issues classified by the classification algorithm as the issues of the one or more issues; and
   execute the script.

2. The apparatus of claim 1, wherein the hardware processor is further configured to train the machine learning algorithm, based on historical issues, to identify the one or more issues affecting the performance of the database server, the historical issues affecting past performances of the database server.

3. The apparatus of claim 2, wherein the historical issues were identified by a system administrator based on historical statistics collected from the database server.

4. The apparatus of claim 1, wherein the statistics comprise at least one of:
   processor usage by the database server;
   memory usage by the database server; and
   storage usage by the database server.

5. The apparatus of claim 1, wherein the hardware processor is further configured to:
   identify a first piece of program code configured to remediate a first issue of the one or more issues;
   identify a second piece of program code configured to remediate the first issue of the one or more issues;
   transmit, to a system administrator, a first message indicating that the first piece of program code and the second piece of program code have been identified to remediate the first issue; and
   receive, from the system administrator, a second message comprising instructions from the system administrator to execute the first piece of program code to remediate the first issue.

6. The apparatus of claim 5, wherein the hardware processor is further configured to train the machine learning algorithm based in part on the instructions provided by the system administrator.

7. The apparatus of claim 1, wherein generating the script comprises:
   selecting one or more blocks of program code from a set of blocks of program code, the one or more blocks of program code comprising adjustable parameters; and
   determining values for the adjustable parameters.

8. A method comprising:
   collecting from a database server, statistics indicating a performance of the database server;
   applying to the statistics, a machine learning algorithm configured to identify, based in part on the statistics, one or more issues affecting the performance of the database server, wherein applying the machine learning algorithm comprises:
   applying to the statistics, a regression algorithm trained to identify one or more candidate issues, each candidate issue of the one or more candidate issues identified by the regression algorithm as affecting the performance of the database server; and
   applying to the one or more candidate issues, a classification algorithm trained to classify each candidate issue of the one or more candidate issues as an issue of the one or more issues or a false positive;
   generating a script comprising program code that, when executed, remediates the candidate issues of the one or more candidate issues classified by the classification algorithm as the issues of the one or more issues; and
   executing the script.

9. The method of claim 8, further configured training the machine learning algorithm, based on historical issues, to identify the one or more issues affecting the performance of the database server, the historical issues affecting past performances of the database server.

10. The method of claim 9, wherein the historical issues were identified by a system administrator based on historical statistics collected from the database server.

11. The method of claim 8, wherein the statistics comprise at least one of:
    processor usage by the database server;
    memory usage by the database server; and
    storage usage by the database server.

12. The method of claim 8, further comprising:
    identifying a first piece of program code configured to remediate a first issue of the one or more issues;
    identifying a second piece of program code configured to remediate the first issue of the one or more issues;
    transmitting, to a system administrator, a first message indicating that the first piece of program code and the second piece of program code have been identified to remediate the first issue; and
    receiving, from the system administrator, a second message comprising instructions from the system administrator to execute the first piece of program code to remediate the first issue.

13. The method of claim 12, further comprising training the machine learning algorithm based in part on the instructions provided by the system administrator.

14. The method of claim 8, wherein generating the script comprises:
    selecting one or more blocks of program code from a set of blocks of program code, the one or more blocks of program code comprising adjustable parameters; and
    determining values for the adjustable parameters.

15. A system comprising:
a database server;
a storage element; and
a processing element operable to:
- collect from the database server, statistics indicating a performance of the database server, the statistics comprising at least one of:
  - processor usage by the database server;
  - memory usage by the database server; and
  - storage usage by the database server;
- apply to the statistics, a machine learning algorithm configured to identify, based in part on the statistics, one or more issues affecting the performance of the database server, wherein applying the machine learning algorithm comprises:
  - applying to the statistics, a regression algorithm trained to identify one or more candidate issues, each candidate issue of the one or more candidate issues identified by the regression algorithm as affecting the performance of the database server; and
  - applying to the one or more candidate issues, a classification algorithm trained to classify each candidate issue of the one or more candidate issues as an issue of the one or more issues or a false positive;
- generate a script comprising program code that, when executed, remediates the candidate issues of the one or more candidate issues classified by the classification algorithm as the issues of the one or more issues; and
- execute the script.

16. The system of claim 15, wherein the processing element is further operable to train the machine learning algorithm, based on historical issues, to identify the one or more issues affecting the performance of the database server, the historical issues affecting past performances of the database server.

17. The system of claim 16, wherein the historical issues were identified by a system administrator based on historical statistics collected from the database server.

18. The system of claim 15, wherein the processing element is further operable to:
- identify a first piece of program code configured to remediate a first issue of the one or more issues;
- identify a second piece of program code configured to remediate the first issue of the one or more issues;
- transmit, to a system administrator, a first message indicating that the first piece of program code and the second piece of program code have been identified to remediate the first issue; and
- receive, from the system administrator, a second message comprising instructions from the system administrator to execute the first piece of program code to remediate the first issue.

19. The system of claim 18, wherein the processing element is further operable to train the machine learning algorithm based in part on the instructions provided by the system administrator.

20. The system of claim 15, wherein generating the script comprises:
- selecting one or more blocks of program code from a set of blocks of program code, the one or more blocks of program code comprising adjustable parameters; and
- determining values for the adjustable parameters.

* * * * *